(12) United States Patent
Fukuura

(10) Patent No.: US 12,105,022 B2
(45) Date of Patent: Oct. 1, 2024

(54) METAL-BASED PARTICLE ASSEMBLY, LAYERED BODY AND SENSING APPARATUS

(71) Applicant: SUMITOMO CHEMICAL COMPANY, LIMITED, Tokyo (JP)

(72) Inventor: Tomohiro Fukuura, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 317 days.

(21) Appl. No.: 17/779,029

(22) PCT Filed: Feb. 24, 2021

(86) PCT No.: PCT/JP2021/006763
§ 371 (c)(1),
(2) Date: May 23, 2022

(87) PCT Pub. No.: WO2021/192785
PCT Pub. Date: Sep. 30, 2021

(65) Prior Publication Data
US 2022/0412889 A1    Dec. 29, 2022

(30) Foreign Application Priority Data
Mar. 25, 2020 (JP) ................................ 2020-053900

(51) Int. Cl.
*G01N 21/64* (2006.01)
(52) U.S. Cl.
CPC . *G01N 21/6428* (2013.01); *G01N 2021/6439* (2013.01)
(58) Field of Classification Search
CPC ....... G01N 21/6428; G01N 2021/6439; G01N 21/648
See application file for complete search history.

(56) References Cited

U.S. PATENT DOCUMENTS

| 2004/0157237 A1 | 8/2004 | Malak et al. |
| 2010/0047820 A1 | 2/2010 | Ohtsuka |

(Continued)

FOREIGN PATENT DOCUMENTS

| JP | 2007-139540 A | 6/2007 |
| JP | 2010-48756 A | 3/2010 |

(Continued)

OTHER PUBLICATIONS

Japanese Office Action (including an English translation thereof) issued in the corresponding Japanese Patent Application No. 2020-053900 on Nov. 21, 2023.

(Continued)

*Primary Examiner* — David P Porta
*Assistant Examiner* — Meenakshi S Sahu
(74) *Attorney, Agent, or Firm* — Birch, Stewart, Kolasch & Birch, LLP

(57) ABSTRACT

Provided are a metal-based particle assembly including a plurality of metal-based particles arranged apart from each other, wherein the plurality of metal-based particles are each arranged so that an average distance between metal-based particles adjacent to each other is 1 nm or more and 1000 nm or less, and a standard deviation of the average distance is 25 nm or less; a layered body including the metal-based particle assembly; and a sensing apparatus including the layered body, a capturing layer that is arranged on the metal-based particle assembly and has a capturing substance for capturing an analyte, the analyte being labeled with a luminescent substance, a light-transmitting member, a light source that emits excitation light for exciting the luminescent substance, and a detector that detects emission from the luminescent substance.

9 Claims, 6 Drawing Sheets

(56) References Cited

U.S. PATENT DOCUMENTS

| | | |
|---|---|---|
| 2012/0078466 A1 | 3/2012 | Natori et al. |
| 2018/0340830 A1 | 11/2018 | Yang et al. |
| 2020/0158723 A1 | 5/2020 | Yanagawa |

FOREIGN PATENT DOCUMENTS

| | | | | |
|---|---|---|---|---|
| JP | 2010-286331 A | 12/2010 | | |
| JP | 2014-228322 A | 12/2014 | | |
| JP | 2015-52562 A | 3/2015 | | |
| JP | WO2017130839 | * 8/2017 | ............ | G01N 21/64 |
| JP | 2017-211395 A | 11/2017 | | |
| WO | WO 2017/130839 A1 | 8/2017 | | |
| WO | WO 2019/069717 A1 | 4/2019 | | |

OTHER PUBLICATIONS

Yokota, "Optical properties of semiconductor/metal nanoparticle layered structures," academic thesis (of Osaka City University), Mar. 2016, pp. 1-73 (154 pages total (including an English translation thereof).
Extended European Search Report dated Oct. 20, 2023 for Application No. 21774709.6.
International Search Report (PCT/ISA/210) for PCT/JP2021/006763, dated May 25, 2021.

* cited by examiner

[Figure 1]
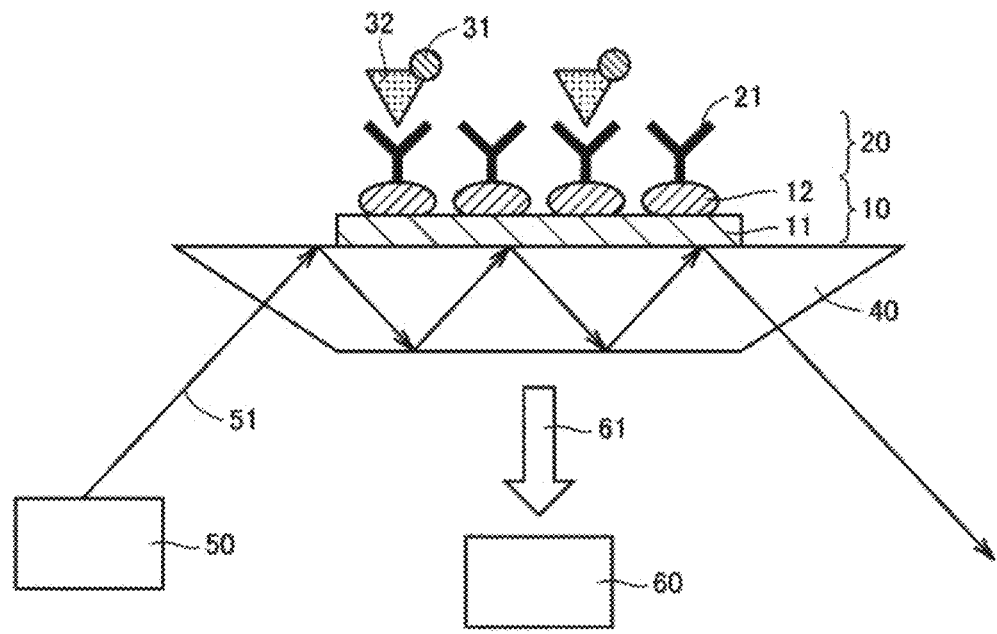
[Figure 2]
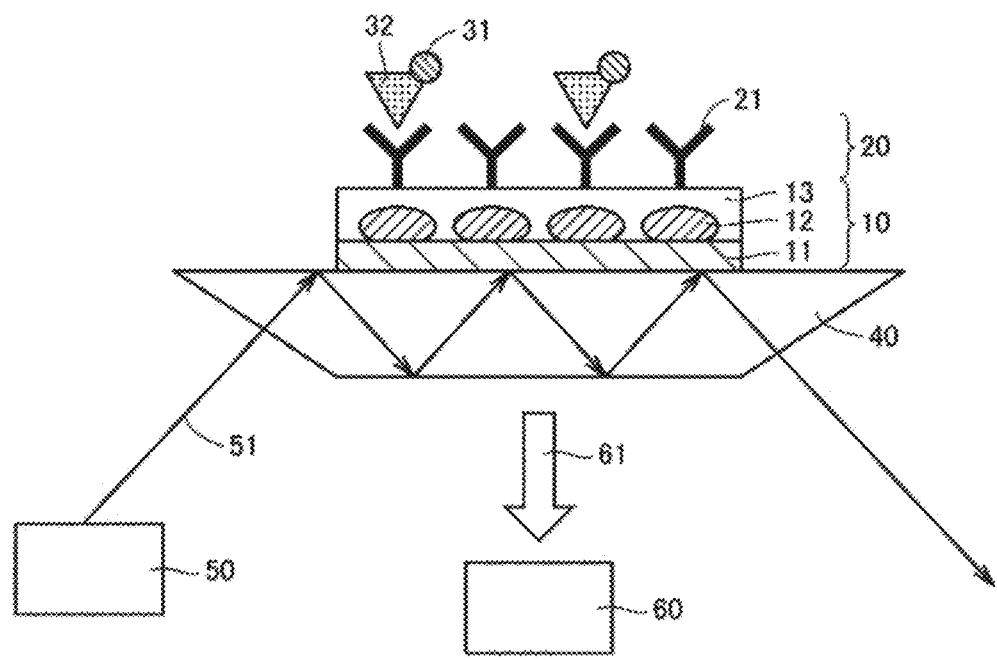

[Figure 3]
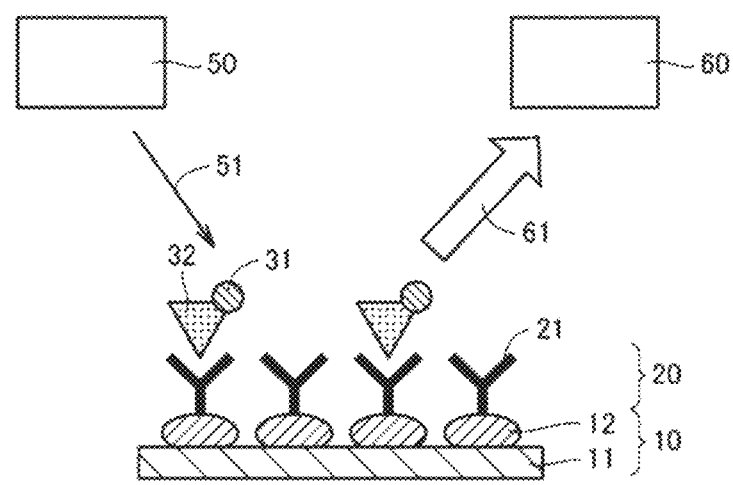

[Figure 4]
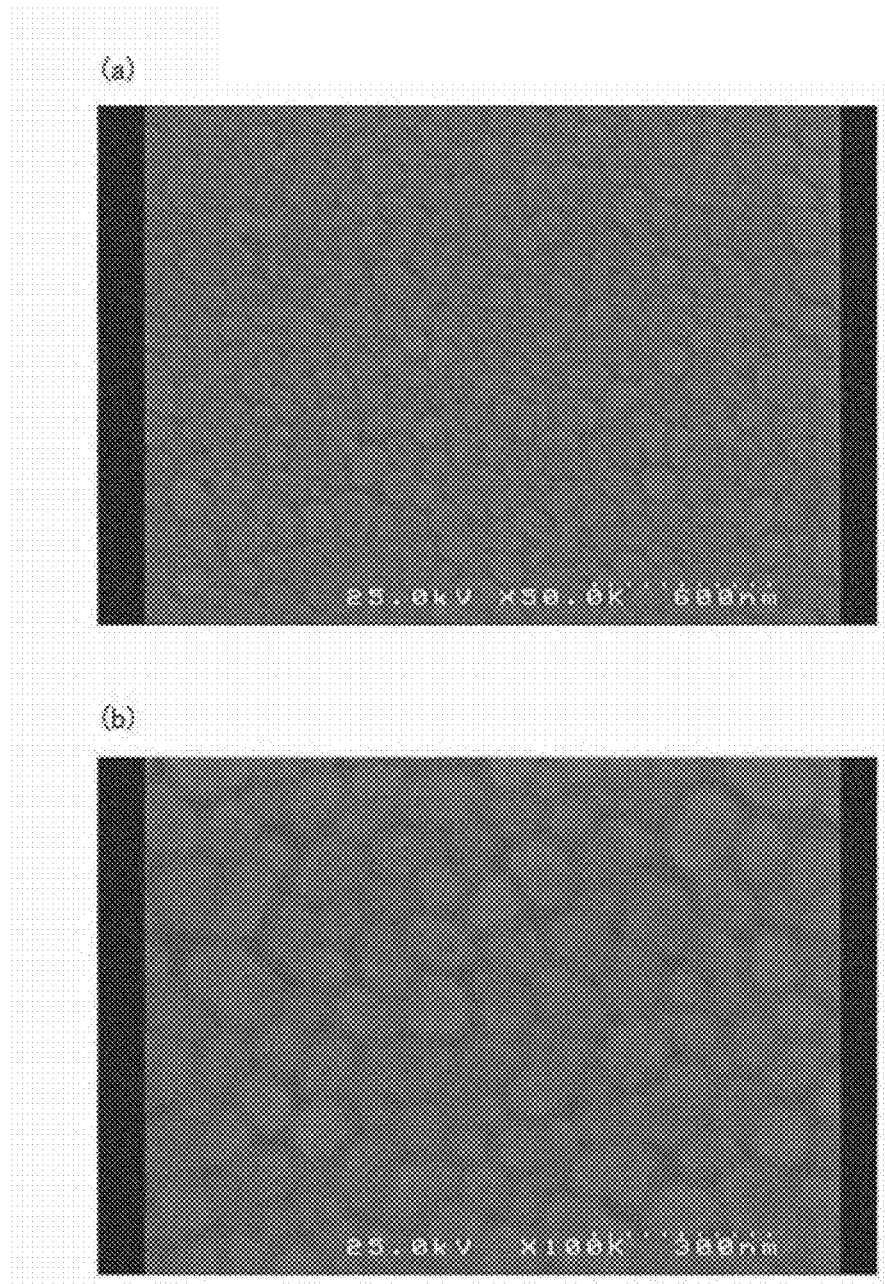

[Figure 5]
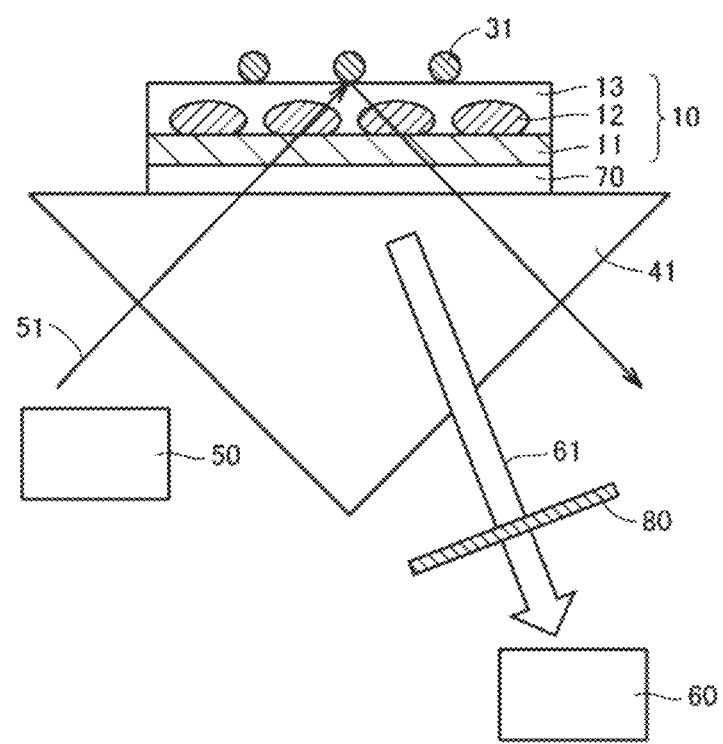

[Figure 6]
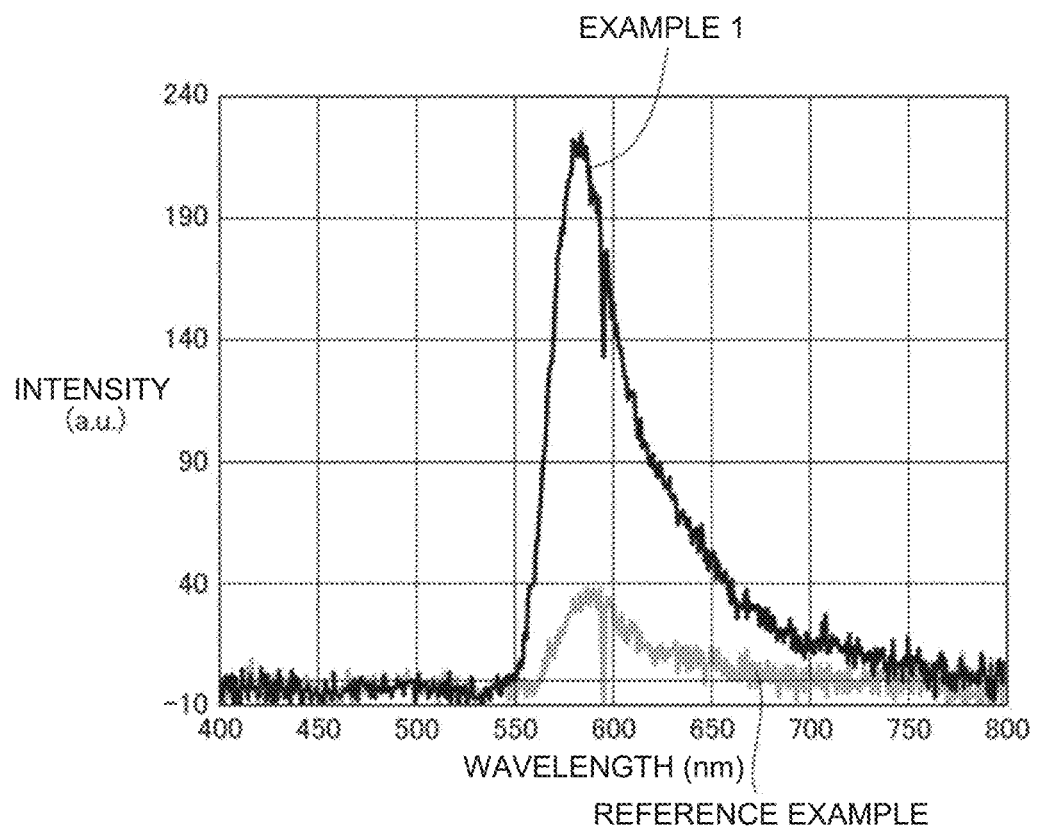

[Figure 7]
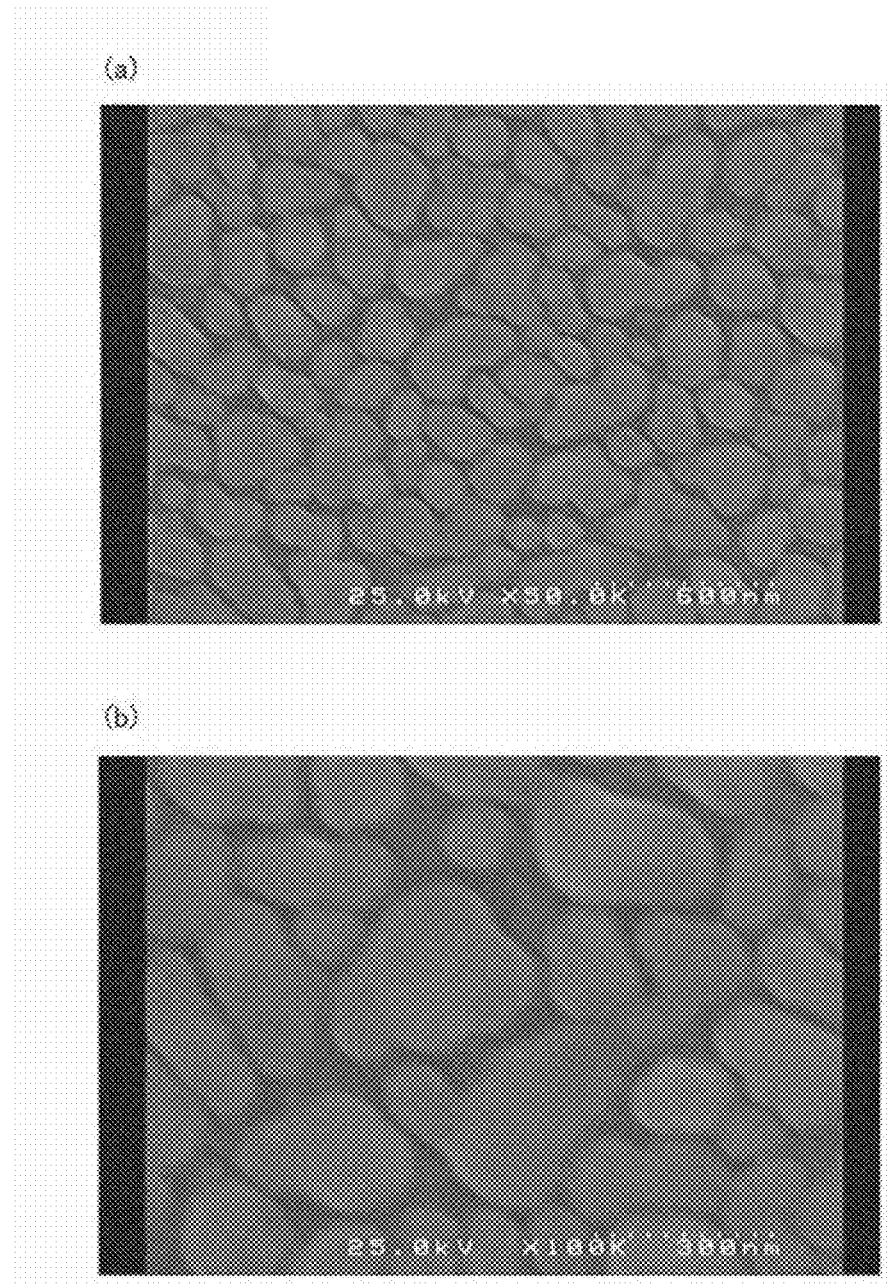

METAL-BASED PARTICLE ASSEMBLY, LAYERED BODY AND SENSING APPARATUS

TECHNICAL FIELD

The present invention relates to a metal-based particle assembly and a layered body comprising the same, and a sensing apparatus comprising the layered body.

BACKGROUND ART

Optical biosensing apparatuses, which qualitatively or quantitatively detect an analyte labeled with a luminescent substance such as a phosphor, by analyzing emission from the luminescent substance, play an important role in various fields as apparatuses that can realize high-speed analysis. For example, virus sensors, ion sensors, DNA chips, protein chips, sugar chain chips, lectin chips, non-invasive glucose sensors, and the like are known as such optical biosensing apparatuses.

Patent Literature 1 is a prior art document relating to the present invention. Patent Literature 1 discloses a technique exploiting localized plasmon resonance phenomenon for enhanced fluorescence. Non Patent Literature 1 indicates a study on localized plasmon resonance of silver nanoparticles.

CITATION LIST

Patent Literature

Patent Literature 1: Japanese Patent Laid-Open No. 2007-139540

Non Patent Literature

Non Patent Literature 1: T. Fukuura and M. Kawasaki, "Long Range Enhancement of Molecular Fluorescence by Closely Packed Submicro-scale Ag Islands", e-Journal of Surface Science and Nanotechnology, 2009, 7, 653

SUMMARY OF INVENTION

Technical Problem

In conventional optical biosensing apparatuses, a high-sensitivity spectrometer is required for performing high-sensitivity analysis in some cases, because of low intensity of the emission from the luminescent substance. Moreover, when the amount of the analyte is small, high-sensitivity analysis can be more difficult, and a plurality of measurements may be required, or the substance is not detected in some cases.

One object of the present invention is to provide a novel structure that can be used in an optical sensing apparatus and is useful as an enhancing element to enhance the emission of a luminescent substance.

Another object of the present invention is to provide a sensing apparatus comprising such a structure and thereby has improved sensitivity.

Solution to Problem

The present invention provides the following metal-based particle assembly, layered body, and sensing apparatus:

[1] A metal-based particle assembly comprising a plurality of metal-based particles arranged apart from each other, wherein the plurality of metal-based particles are each arranged so that an average distance between metal-based particles adjacent to each other is 1 nm or more and 1000 nm or less, and a standard deviation of the average distance is 25 nm or less.

[2] The metal-based particle assembly according to [1], wherein the plurality of metal-based particles have an average particle diameter of 5 nm or more and 800 nm or less.

[3] A layered body comprising:

a substrate having a first main surface and a second main surface opposed to the first main surface; and the metal-based particle assembly according to [1] or [2] layered on the first main surface, wherein the plurality of metal-based particles are arranged two-dimensionally apart from each other in the metal-based particle assembly.

[4] The layered body according to [3], wherein a proportion of an area covered with the metal-based particle assembly to an area of the first main surface is 65% or more.

[5] A sensing apparatus for detecting an analyte, comprising:

the layered body according to [3] or [4];

a capturing layer that is arranged on the metal-based particle assembly and has a capturing substance for capturing the analyte, the analyte being labeled with a luminescent substance;

a light source that emits excitation light for exciting the luminescent substance; and a detector that detects emission from the luminescent substance.

[6] The sensing apparatus according to [5], further comprising a supporting member arranged opposite to the metal-based particle assembly side relative to the substrate.

[7] The sensing apparatus according to [5], wherein the substrate has light-transmitting properties, and the detector is arranged opposite to the metal-based particle assembly side relative to the substrate.

[8] The sensing apparatus according to [6], wherein the capturing layer, the metal-based particle assembly, the substrate, and the supporting member are arranged in this order, the substrate and the supporting member have light-transmitting properties, and the detector is arranged opposite to the substrate side relative to the supporting member.

[9] The sensing apparatus according to [8], wherein the excitation light enters into the supporting member.

Advantageous Effects of Invention

There is provided a structure that can be used in an optical sensing apparatus and is useful as an enhancing element to enhance the emission of a luminescent substance. There is also provided a sensing apparatus comprising such a structure and thereby has improved sensitivity.

BRIEF DESCRIPTION OF DRAWINGS

FIG. 1 is a schematic cross-sectional view showing one example of the sensing apparatus according to the present invention.

FIG. 2 is a schematic cross-sectional view showing another example of the sensing apparatus according to the present invention.

FIG. 3 is a schematic cross-sectional view showing still another example of the sensing apparatus according to the present invention.

FIG. 4 shows SEM images (at scales of 50000 and 100000 times) of the metal-based particle assembly in the layered body obtained in Example 1, as observed from directly above.

FIG. 5 is a schematic cross-sectional view showing the optical sensing apparatus produced in Example 1.

FIG. 6 shows emission spectra obtained in Example 1 and the Reference Example.

FIG. 7 shows SEM images (at scales of 50000 and 100000 times) of the metal-based particle assembly in the layered body obtained in Example 2, as observed from directly above.

DESCRIPTION OF EMBODIMENTS

Metal-Based Particle Assembly (1) Summary

The metal-based particle assembly according to the present invention (hereinafter also simply referred to as the "metal-based particle assembly") is a metal-based particle assembly comprising a plurality of metal-based particles arranged apart from each other. The plurality of metal-based particles are preferably arranged two-dimensionally apart from each other.

In the metal-based particle assembly, the metal-based particles are each arranged so that an average distance between metal-based particles adjacent to each other (hereinafter also referred to as the "average interparticle distance") is 1 nm or more and 1000 nm or less, and a standard deviation of the average interparticle distance is 25 nm or less.

The metal-based particle assembly according to the present invention is a plasmonic structure. "Plasmonic structure" refers to a structure capable of exhibiting localized plasmon resonance. Plasmon is a compressional wave of free electrons generated by collective oscillation of the free electrons in a structure.

Because of the localized plasmon resonance, the metal-based particle assembly according to the present invention can enhance the intensity of emission from a luminescent substance that labels an analyte, and thus, is suitable for use as an emission enhancing element for an optical sensing apparatus. By applying the metal-based particle assembly to an optical sensing apparatus, the sensitivity of the optical sensing apparatus can be improved.

The conventional plasmonic structure as disclosed in Patent Literature 1 has the constraint that the distance between the plasmonic structure and the luminescent substance to be excited should be set in the range (1 to 10 nm) where the energy transfer by the Dexter mechanism, which is the direct transfer of electrons, does not occur, but the energy transfer by the Foerster mechanism is achieved. Thus, localized plasmon resonance with the above-described conventional plasmonic structure has an essential issue in that the range of its effect is limited in an extremely narrow range of 10 nm or less from the plasmonic structure surface. This issue inevitably invites an issue in that little emission enhancing effect is observed in an attempt to enhance emission from the luminescent substance as an emission label to achieve improved sensitivity, by applying localized plasmon resonance with metal nanoparticles to an optical sensing apparatus. This is because the distance between the plasmonic structure surface and the luminescent substance is usually above 10 nm in the optical sensing apparatus.

The metal-based particle assembly according to the present invention can solve the above-described issue in localized plasmon resonance with the above-described conventional plasmonic structure, because it can exhibit the following characteristics:

[a] Compared to using the above-described conventional plasmonic structure, the range of the effect of plasmon resonance (the range where the emission enhancing effect of plasmon is effective) is broader, and even the emission from the luminescent substance present in the range of, for example, several hundred nm from the surface of the metal-based particle assembly can be enhanced.

[b] Compared to using the above-described conventional plasmonic structure, more intense plasmon resonance is exhibited, and hence, a higher emission enhancing effect can be achieved.

The characteristics [a] and [b] are believed to be achieved by interactions between localized plasmons of the metal-based particles, caused by the plurality of metal-based particles being arranged so that the average interparticle distance is in the predetermined range, and the standard deviation of the average interparticle distance is in the predetermined range.

Regarding the characteristic [a], the metal-based particle assembly according to the present invention can enhance the emission of the luminescent substance arranged at a position, for example, 10 nm or more away, further several ten nm (for example 20 nm, 30 nm or 40 nm) or more away, and still further 100 nm or more, or 200 nm or more away.

Regarding the characteristic [b], the intensity of plasmon resonance exhibited by the metal-based particle assembly according to the present invention is not that of a simple sum total of localized plasmon resonances exhibited by the individual metal-based particles at a specific wavelength, but rather, is higher than that. More specifically, because the plurality of metal-based particles are arranged so that the above-described average interparticle distance is in the predetermined range, and the standard deviation of the average interparticle distance is in the predetermined range, intense plasmon resonance is achieved by interactions of the individual metal-based particles with each other. This intense plasmon resonance is believed to be achieved by interactions between localized plasmons of the metal-based particles.

In general, when a plasmonic structure is subjected to absorption spectrum measurement by absorptiometry, a plasmon resonance peak (hereinafter also referred to as a "plasmon peak") is observed as a peak at the longest wavelength in the ultraviolet to visible light region.

The absorption spectrum of the metal-based particle assembly can be measured by absorptiometry, using the metal-based particle assembly formed on a glass substrate as a measurement sample. Specifically, the absorption spectrum is obtained as follows: Incident light in the ultraviolet to visible light region is directed from the back surface side of the glass substrate layered with the metal-based particle assembly (i.e., the side opposite to the metal-based particle assembly) in a direction perpendicular to the substrate surface, and intensity I of the transmitted light omnidirectionally transmitted toward the metal-based particle assembly is measured with an integrating sphere spectrophotometer. On the other hand, the same incident light as described above is directed in a direction perpendicular to the surface of a substrate not layered with the metal-based particle assembly, which has the same thickness and the same material as those of the substrate of the measurement sample, and intensity $I_0$ of transmitted light omnidirectionally transmitted through the side opposite to the incident surface is measured with the integrating sphere spectrophotometer. In this case, the absorbance along the vertical axis in the absorption spectrum is represented by the following expression:

Absorbance=$-\log_{10}(I/I_0)$

The absorption spectrum can be measured using a common spectrophotometer.

To measure the maximum wavelength and the absorbance at the maximum wavelength of the plasmon peak at the longest wavelength in the ultraviolet to visible light region, absorption spectrum measurement may be performed using an objective lens and a spectrophotometer to narrow the field of view.

(2) Structure of Metal-Based Particle Assembly

The metal-based particles constituting the metal-based particle assembly is formed of a material capable of plasmon resonance in the ultraviolet to visible Might region. The material capable of plasmon resonance in the ultraviolet to visible light region means a material that, when in the form of nanoparticles or an assembly thereof, exhibits a plasmon peak appearing in the ultraviolet to visible light region in absorption spectrum measurement by absorptiometry.

Examples of metal-based materials capable of plasmon resonance in the ultraviolet to visible light region include noble metals, such as gold, silver, copper, platinum, and palladium; metals other than noble metals, such as aluminum and tantalum; alloys containing metals selected from the noble metals and the metals other than noble metals; and metal compounds (such as metal oxides and metal salts) containing metals selected from the noble metals and the metals other than noble metals. Among these, preferred metal-based materials capable of plasmon resonance in the ultraviolet to visible light region are noble metals, such as gold, silver, copper, platinum, and palladium, and more preferred is silver, because it is inexpensive and has small absorption (or has a small imaginary part of the dielectric function at visible light wavelengths).

The plurality of metal-based particles constituting the metal-based particle assembly preferably have an average particle diameter of 5 nm or more, more preferably 10 nm or more, still more preferably 20 nm or more, even more preferably more than 20 nm, in view of effectively achieving the above-described effects [a] and [b]. The plurality of metal-based particles constituting the metal-based particle assembly preferably have an average particle diameter of 800 nm or less, more preferably 550 nm or less, still more preferably 300 nm or less, even more preferably 250 nm or less, particularly preferably 150 nm or less, in view of effectively achieving the above-described effects [a] and [b]. The average particle diameter of the metal-based particles is preferably selected appropriately according to the type of metal-based material constituting the metal-based particles.

The average particle diameter of the plurality of metal-based particles refers to the average value of the particle diameter obtained as follows: In an SEM image observed from directly above the metal-based particle assembly in which the plurality of metal-based particles are arranged two-dimensionally, 10 particles are selected at random. In each particle image, five tangential diameters are drawn at random (note that all the straight lines serving as the tangential diameters can pass through only the inside of the particle image, and one of these lines is a straight line that passes through only the inside of the particle and can be drawn the longest). When the average value thereof (this average value is hereinafter also referred to as the "average tangential diameter") is obtained as the particle diameter of each particle, the average particle diameter of the plurality of metal-based particles is the average value of the particle diameters for the 10 selected particles. The tangential diameter is defined as a perpendicular line connecting a distance defined by two parallel lines sandwiching the particle contour (projected image) in contact therewith (see the Nikkan Kogyo Shimbun, Ltd., "Particle Measurement Technique," 1994, page 5).

The method of measuring the average particle diameter is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 10 random numbers ($x_1$, $x_2$, $x_3$, $x_4$, $x_5$, $x_6$, $x_7$, $x_8$, $x_9$, and $x_{10}$) from 1 to 1280 and 10 random numbers ($y_1$, $y_2$, $y_3$, $y_4$, $y_5$, $y_6$, $y_7$, $y_8$, $y_9$, and $y_{10}$) from 1 to 960. From the respective sets of 10 random numbers thus obtained, 10 sets of random number combinations ($x_1$, $y_1$), ($x_2$, $y_2$), ($x_3$, $y_3$), ($x_4$, $y_4$), ($x_5$, $y_5$), ($x_6$, $y_6$), ($x_7$, $y_7$), ($x_8$, $y_8$), ($x_9$, $y_9$), and ($x_{10}$, $y_{10}$) are obtained. Using the values of the random numbers generated from 1 to 1280 as x-coordinates and the values of the random numbers generated from 1 to 960 as y-coordinates, 10 sets of coordinate points ($x_1$, $y_1$), ($x_2$, $y_2$), ($x_3$, $y_3$), ($x_4$, $y_4$), ($x_5$, $y_5$), ($x_6$, $y_6$), ($x_7$, $y_7$), ($x_8$, $y_8$), ($x_9$, $y_9$) and ($x_{10}$, $y_{10}$) are obtained. Then, for each of the total of 10 particle images including the coordinate points, the above-described average tangential diameter is obtained, and then the average particle diameter is obtained as the average value of the average tangential diameters for the 10 particles. If at least any one of the 10 coordinate points that are the 10 sets of random number combinations is not included in a particle image, or if two or more coordinate points are included in an identical particle, then these random number combinations are discarded, and random number generation is repeated until all the 10 coordinate points are included in different particle images.

The metal-based particles can be observed, for example, by SEM observation. The scanning electron microscope "JSM-5500" produced by JEOL Ltd. or its equivalent is used to measure a SEM image.

Specifically, as used herein, the "particles" of the "metal-based particles" refers to relatively bright portions surrounded by relatively dark portions in an image obtained by reading in the obtained 50000 times magnified SEM image at 1280 horizontal pixels×960 vertical pixels, using the free image processing software "ImageJ" produced by U.S. National Institutes of Health. The image may be an image with its contrast and brightness adjusted according to the method described in connection with the measurement of coverage in the [Examples] section below.

In the metal-based particle assembly, the plurality of metal-based particles are each arranged so that the average distance between metal-based particles adjacent to each other (average interparticle distance) is 1 nm or more and 1000 nm or less. When the metal-based particles are arranged at this average interparticle distance, effects such as intense plasmon resonance and an extended range of the effect of plasmon resonance can be achieved.

The average interparticle distance is preferably 1 nm or more and 150 nm or less, more preferably 1 nm or more and 60 nm or less, still more preferably 1 nm or more and 30 nm or less, and even more preferably 1 nm or more and 20 nm or less, in view of effectively achieving the above-described effects [a] and [b]. If the average interparticle distance is less than 1 nm, electron transfer between the particles attributed to the Dexter mechanism occurs, which disadvantageously deactivates localized plasmon.

The metal-based particle assembly comprising the plurality of metal-based particles arranged apart from each other may be conductive or non-conductive as the assembly. For example, there may or may not be a conductive substance interposed between the metal-based particles.

Non-conductivity as the assembly can be confirmed, for example, as follows: The metal-based particle assembly is contacted with a pair of tester probes of a multimeter [tester ("E2378A") produced by Hewlett Packard Co.)] at a distance of 10 to 15 mm therefrom, and the range is set to "30 MΩ". In this case, if the resistance is measured as 30 MΩ or more under this measurement condition and at a result, "overload" is displayed, then non-conductivity is confirmed.

The average interparticle distance is obtained as follows: In an SEM image observed from directly above the metal-based particle assembly in which the plurality of metal-based particles are arranged two-dimensionally, 30 particles are selected at random, and for each selected particle, an interparticle distance from an adjacent particle is obtained, and the average value of interparticle distances of these 30 particles is obtained as the average interparticle distance. The interparticle distance from an adjacent particle is obtained as follows: A distance from every adjacent particle (minimum distance between the surfaces of adjacent particles) is measured, and such measurements are averaged to obtain the interparticle distance from an adjacent particle.

The method of measuring the average interparticle distance is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 30 random numbers ($x_1$ to $x_{30}$) from 1 to 1280 and 30 random numbers ($y_1$ to $y_{30}$) from 1 to 960. From the respective sets of 30 random numbers thus obtained, 30 sets of random number combinations ($x_1$, $y_1$) to ($x_{30}$, $y_{30}$) are obtained. Using the values of the random numbers generated from 1 to 1280 as x-coordinates and the values of the random numbers generated from 1 to 960 as y-coordinates, 30 sets or coordinate points ($x_1$, $y_1$) to ($x_{30}$, $y_{30}$) are obtained. Then, for each of the total of 30 particle images including the coordinate points, an interparticle distance from a particle adjacent to that particle is obtained, and then the average interparticle distance is obtained as the average value of interparticle distances from adjacent particles for the 30 particles. If at least any one of the 30 coordinate points that are the 30 sets of random number combinations is not included in a particle image, or if two or more coordinate points are included in an identical particle, then these random number combinations are discarded, and random number generation is repeated until all the 30 coordinate points are included in different particle images.

In the metal-based particle assembly, the plurality of metal-based particles are arranged so that the standard deviation of the average interparticle distance is 25 nm or less. When the metal-based particles are arranged so that the standard deviation falls in this range, effects such as intense plasmon resonance and an extended range of the effect of plasmon resonance can be achieved.

The standard deviation of the average interparticle distance is preferably 20 nm or less, in view of effectively achieving the above-described effects [a] and [b]. The standard deviation of the average interparticle distance is preferably 0.1 nm or more, more preferably 0.2 nm or more, and still more preferably 0.3 nm or more, in view of effectively achieving the above-described effects [a] and [b].

The standard deviation of the average interparticle distance is defined as follows: In an SEM image observed from directly above the metal-based particle assembly in which the plurality of metal-based particles are arranged two-dimensionally, one particle is initially selected at random, and for that particle, an interparticle distance from an adjacent particle is obtained. The interparticle distance from an adjacent particle is obtained as follows: A distance from every adjacent particle (minimum distance between their surfaces) is measured, and such measurements are averaged to obtain the interparticle distance from an adjacent particle. In the above-described SEM image, 29 particles different from the above-described one particle are selected at random, and interparticle distances from adjacent particles are obtained for these 29 particles in the same manner as above. The standard deviation of the interparticle distances from adjacent particles for the total of 30 particles thus obtained is defined as the standard deviation of the average interparticle distance.

The method of measuring the standard deviation of the average interparticle distance is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 30 random numbers ($x_1$ to $x_{30}$) from 1 to 1260 and 30 random numbers ($y_1$ to $y_{30}$) from 1 to 960. From the respective sets of 30 random numbers thus obtained, 30 sets of random number combinations ($x_1$, $y_1$) to ($x_{30}$, $y_{30}$) are obtained. Using the values of the random numbers generated from 1 to 1280 as z-coordinates and the values of the random numbers generated from 1 to 960 as y-coordinates, 30 sets of coordinate points ($x_1$, $y_1$) to ($x_{30}$, $y_{30}$) are obtained. Then, for each of the total of 30 particle images including the coordinate points, an interparticle distance from a particle adjacent to that particle is obtained, and then the standard deviation of the average interparticle distance is obtained as the standard deviation of interparticle distances from adjacent particles for the 30 particles. If at least any one of the 30 coordinate points that are the 30 sets of random number combinations is not included in a particle image, or if two or more coordinate points are included in an identical particle, then these random number combinations are discarded, and random number generation is repeated until all the 30 coordinate points are included in different particle images.

The plurality of metal-based particles constituting the metal-based particle assembly preferably have an average height of 5 nm or more and 500 nm or less, more preferably 5 nm or more and 300 nm or less, still more preferably 5 nm or more and 150 nm or less, even more preferably 5 nm or more and 100 nm or less, particularly preferably 5 nm or more and 50 nm or less, in view of effectively achieving the above-described effects [a] and [b].

The average height of the plurality of metal-based particles is obtained as follows: In an AFM image of the metal-based particle assembly, 10 particles are selected at random, heights of these 10 particles are measured, and the average value of the 10 measurements is obtained as the average height.

The plurality of metal-based particles constituting the metal-based particle assembly preferably have an aspect ratio of 1 or more and 8 or less, more preferably 1 or more and 6 or less, still more preferably 1.5 or more and 5.5 or less, even more preferably 1.5 or more and 5.0 or less, in view of effectively achieving the above-described effects [a] and [b].

The aspect ratio is defined as the ratio of the above-described average particle diameter to the above-described average height (i.e., average particle diameter/average height). While the metal-based particles may have a spherical shape, they preferably have a flat shape with an aspect ratio of above 1, in view of effectively achieving the above-described effects [a] and [b].

The metal-based particles preferably have a smooth curved surface, and particularly preferably have a flat shape whose surface is a smooth curved surface, in view of exciting highly effective plasmon. However, the metal-based particles may have some minute recesses and projections (roughness) on the surface, and may in that sense have an amorphous shape.

The metal-based particles preferably have variations in size as small as possible, in view of uniformity in intensity of plasmon resonance within a plane of the metal-based particle assembly. Even if there is some variation in particle diameter, it is not preferred that the standard deviation of the distance between large-size particles is large, and it is preferred that the distance is filled with small-size particles to facilitate causing interactions between the large-size particles.

The number of the metal-based particles contained in the metal-based particle assembly is usually 30 or more, and preferably 50 or more. When the metal-based particle assembly is formed to contain 30 or more metal-based particles, intense plasmon resonance and an extended range of the effect of plasmon resonance can be easily achieved because of interactions between localized plasmons of the metal-based particles.

In view of applying the metal-based particle assembly to an optical sensing apparatus, the number of the metal-based particles contained in the metal-based particle assembly may be, for example, 300 or more, and even 17500 or more. The metal-based particles in the metal-based particle assembly preferably have a number density of 7 particles/$\mu m^2$ or more, more preferably 15 particles/$\mu m^2$ or more.

(3) Method for Producing Metal-Based Particle Assembly

The metal-based particle assembly can be produced using, for example, the following methods:

[A] a bottom-up method in which the metal-based particles are grown from minute seeds on a substrate;

[B] a method in which the plurality of metal-based particles are coated with a protective film made of an amphiphilic material with a predetermined thickness, and then made into a film on a substrate by the langmuir blodgett (LB) deposition method; and

[C] other methods, such as a method in which a thin film prepared by vapor deposition or sputtering is post-treated; resist processing; etching processing; and a casting method using a dispersion in which the metal-based particles are dispersed.

The method (A) preferably includes the step of growing the metal-based particles at an extremely low rate on a substrate adjusted to a predetermined temperature (hereinafter also referred to as the "particle growth step"). The production method including the particle growth step can produce the metal-based particle assembly according to the present invention in a satisfactorily controlled manner.

In the particle growth step, the metal-based particles are grown on the substrate preferably at an average height growth rate of less than 1 nm/min, more preferably 0.5 nm/min or less. As used herein, the average height growth rate can also be referred to as an average deposition rate or an average thickness growth rate of the metal-based particles, and is defined by the following expression:

average height of the metal-based particles/metal-based particle growth time

The "average height of the metal-based particles" is defined as set forth above.

The metal-based particle growth time refers to the time from the start to the end of the growth of the metal-based particles, specifically, the time during which the metal-based material is supplied. When the metal-based particle assembly is considered to be a film, the metal-based particle growth time can also be referred to as the film deposition time. When the metal-based particles are grown by a sputtering method, the metal-based particle growth time is the sputtering time.

In the particle growth step, the temperature of the substrate is preferably 100° C. or more and 450° C. or less, more preferably 200° C. or more and 450° C. or less, still more preferably 250° C. or more and 350° C. or less, and even more preferably 300° C. or thereabout (about 300° C.±10° C.).

By adjusting the average height growth rate, the substrate temperature and/or the metal-based particle growth time, for example, the average interparticle distance and the standard deviation thereof, the average particle diameter, the average height, and the aspect ratio of the plurality of metal-based particles grown on the substrate can be controlled.

While the pressure (pressure in the apparatus chamber) at which the metal-based particles are grown is not limited to a particular pressure as long as it allows the particles to be grown, the pressure is usually lower than atmospheric pressure. While the lower limit of the pressure is not limited to a particular value, it is preferably 0.5 Pa or more, more preferably 6 Pa or more, and still more preferably 10 Pa or more, because these pressures facilitate adjusting the average height growth rate within the above-mentioned range.

While the specific method for growing the metal-based particles on a substrate is not limited to a particular method, as long as it allows the particles to be grown at an average height growth rate of less than 1 nm/min, examples of the method include sputtering methods and vapor deposition methods such as vacuum deposition. Among the sputtering methods, a direct current (DC) sputtering method is preferably used, because it allows the metal-based particle assembly to be grown relatively easily, and facilitates maintaining an average height growth rate of less than 1 nm/min.

The sputtering may be performed in any manner, and may be performed using, for example, an ion gun, or a direct current argon ion sputtering method in which argon ions generated by plasma discharge are accelerated in an electric field and directed to a target. Other conditions such as current value, voltage value, and substrate-to-target distance in the sputtering method are adjusted appropriately to allow the particles to be grown at an average height growth rate of less than 1 nm/min.

To produce the metal-based particle assembly according to the present invention in a satisfactorily controlled manner, it is preferred to set, in the particle growth step, the average height growth rate to less than 1 nm/min, and additionally, set the average particle diameter growth rate to less than 5 nm. Usually, the average particle diameter growth rate is less than 5 nm when the average height growth rate is less than 1 nm/min. The average particle diameter growth rate is more preferably 1 nm/min or less. The average particle diameter growth rate is defined by the following expression:

average particle diameter of the metal-based particles/metal-based particle growth time The "average particle diameter of the metal-based particles" and the "metal-based particle Growth time" are defined as set forth above.

To produce a metal-based particle assembly with the predetermined average interparticle distance and standard deviation of the average interparticle distance, it is preferred to appropriately adjust the metal-based particle growth time in the particle growth step while considering the above-described preferred production conditions.

Layered Body

The layered body according to the present invention (hereinafter also simply referred to as the "layered body") comprises a substrate having a first main surface and a second main surface opposed to the first main surface; and the above-described metal-based particle assembly according to the present invention layered on the first main surface. The substrate is typically a substrate for growing the above-described metal-based particles.

The substrate is preferably formed of a non-conductive material. If the substrate is formed of a conductive material, donation and acceptance of electrons can occur between the metal-based particles formed on that substrate, and thus, the plasmon resonance effect tends to be reduced. However, a conductive substrate can also be suitably used as long as the plasmon resonance effect is not lost.

Examples of the non-conductive material constituting the substrate include inorganic insulating materials, such as mica, $SiO_2$, $ZrO_2$, and glass, and thermoplastic resins.

Examples of the conductive substrate include a substrate formed of a conductive material, such as a metal material, and a multilayer substrate having a layer composed of a metal material on the surface of the substrate formed of the non-conductive material.

The substrate preferably has a surface as smooth as possible. In particular, the surface of the substrate is more preferably smooth at the atomic level. The smoother the substrate surface is, the more easily a metal-based particle being grown merges with another surrounding adjacent metal-based particle, because of thermal energy received from the substrate. As a result, an assembly formed of larger-size metal-based particles tends to be easily obtained.

The substrate may be a substrate with light-transmitting properties, for example, an optically transparent substrate, or the substrate may be non-light-transmitting (light-absorbing).

The substrate with light-transmitting properties preferably has a light transmittance of 80% or more, more preferably a light transmittance of 90% or more, with respect to the light that is to be transmitted through the substrate.

In the layered body, the proportion of the area covered with the metal-based particle assembly to the area of the first main surface of the substrate (coverage) is preferably 65% or more, more preferably 70% or more, and still preferably 75% or more, in view of effectively achieving the above-described effects [a] and [b].

The coverage can be measured using the following method: Initially, the free image processing software "ImageJ" produced by U.S. National Institutes of Health is used to read in, at 8 bit and 720×480 pixels, a 50000 times magnified image obtained by SEM observation from directly above the metal-based particle assembly in which the plurality of metal-based particles are arranged two-dimensionally. The scanning electron microscope "JSM-5500" produced by JEOL Ltd. or its equivalent is used to measure the SEM image. The range of 500×350 pixels is selected (selected so as not to include the ruler and letters shown in the image) from the resulting image. The contrast and brightness of the selected image are preferably adjusted to clearly distinguish between the above-described relatively bright portions (portions corresponding to the metal-based particles) and the above-described relatively dark portions (portions not corresponding to the metal-based particles). The contrast and brightness can be adjusted using, for example, the method described in the [Examples] section below.

Then, the random number generator function "RANDBETWEEN" of the spreadsheet software "Excel" produced by Microsoft Corporation is used to obtain three random numbers ($x_1$, $x_2$, and $x_3$) from 1 to 720 and three random numbers ($y_1$, $y_2$, and $y_3$) from 1 to 480. From the respective sets of three random numbers thus obtained, three sets of random number combinations ($x_1$, $y_1$), ($x_2$, $y_2$), and ($x_3$, $y_3$) are obtained. Using the values of the random numbers generated from 1 to 720 as x-coordinates and the values of the random numbers generated from 1 to 480 as y-coordinates, three sets of coordinate points ($x_1$, $y_1$), ($x_2$, $y_2$), and ($x_3$, $y_3$) are obtained. Then, each of the total of three particle images including the coordinate points is designated as "particle 1", "particle 2", or "particle 3". If at least any one of the three coordinate points that are the three sets of random number combinations is not included in a particle image, or if two or more coordinate points are included in an identical particle, or if at least any one of the "particle 1", "particle 2", and "particle 3" is not included in the 500×350 pixels selected above, or the image lies outside the pixels, then these random number combinations are discarded, and random number generation is repeated until all the three coordinate points are included in different particle images, and all the "particle 1", "particle 2", and "particle 3" are completely included in the 500×300 pixels selected above.

Then, the image is binarized. This binarization is performed by adjusting the threshold value to the maximum value in the range where black dots are not seen inside the particles, for all the "particle 1", "particle 2", and "particle 3" determined above. Then, the 500×350 pixels are selected at the same coordinate positions as described above.

For the binarized image, when the count value of a pixel value of zero is defined as Vw, and the count value of a pixel value of 255 is defined as Vb, the coverage is calculated based on the following expression:

coverage (%)=$\{Vw/(Vw+Vb)\}\times 100$

The layered body may include other structural elements besides the substrate and the metal-based particle assembly. Examples of other structural elements include the below-described protective layer.

Sensing Apparatus

The sensing apparatus according to the present invention (hereinafter also simply referred to as the "sensing apparatus") is a sensing apparatus for detecting an analyte.

(1) Structure Example of Sensing Apparatus

FIG. 1 shows one example of the sensing apparatus. The sensing apparatus shown in FIG. 1 includes a layered body 10 according to the present invention as described above, including a substrate 11 and a metal-based particle assembly 12 formed on a first main surface of the substrate 11; a capturing layer 20 that is arranged on the metal-based particle assembly 12 and has a capturing substance 21 for capturing an analyte 32 labeled with a luminescent substance 31; a supporting member 40 arranged on a second main surface of the substrate 11; a light source 50 that emits excitation light 51 for exciting the luminescent substance 31; and a detector 60 that detects emission 61 from the luminescent substance 31.

FIG. 2 shows another example of the sensing apparatus. The sensing apparatus shown in FIG. 2 is identical in structure to the sensing apparatus shown in FIG. 1, except that the layered body 10 further includes a protective layer 13 covering the metal-based particle assembly 12. The capturing layer 20 in the sensing apparatus shown in FIG. 2 is arranged on the protective layer 13.

The sensing apparatuses shown in FIGS. 1 and 2 are total reflection excitation-type optical sensing apparatuses. In the sensing apparatuses shown in FIGS. 1 and 2, preferably, the capturing layer 20, the metal-based particle assembly 12, the substrate 11, and the supporting member 40 are arranged in this order. As described later, the supporting member 40 may not be provided. In this case, in these sensing apparatuses, preferably, the capturing layer 20, the metal-based particle assembly 12, and the substrate 11 are arranged in this order.

In the total reflection excitation-type sensing apparatuses shown in FIGS. 1 and 2, the excitation light 51 emitted from the light source 50 enters into the supporting member 40, and totally reflected inside the supporting member 40. This causes evanescent wave to be generated which flows out slightly from the surface of the substrate 11, outside the substrate 11. This evanescent wave excites the luminescent substance 31. Then, the metal-based particle assembly 12 resonates with the excited luminescent substance 31 to achieve plasmonic emission enhancement. The analyte 32 can be detected qualitatively or quantitatively by detecting the emission 61 from the excited luminescent substance 31 by means of the detector 60 arranged opposite to the metal-based particle assembly 12 side relative to substrate 11, more specifically opposite to the substrate 11 side relative to the supporting member 40. For example, the amount of the analyte 32 that is present can be measured qualitatively or quantitatively by measuring the intensity of the emission 61.

The position where the light source 50 is arranged in the sensing apparatuses shown in FIGS. 1 and 2 is not limited to a particular position, as long as it allows the excitation light 51 to enter into the supporting member 40. For example, the light source 50 may be arranged opposite to the substrate 11 side relative to the supporting member 40, or may be arranged laterally of the supporting member 40.

In the total reflection excitation-type sensing apparatuses shown in FIGS. 1 and 2, the detector 60 may be arranged opposite to the metal-based particle assembly 12 side relative to the substrate 11, more specifically opposite to the substrate 11 side relative to the supporting member 40, or may be arranged on the same side as the metal-based particle assembly 12 side relative to the substrate 11, more specifically on the same side as the substrate 11 side relative to the supporting member 40.

When the supporting member 40 is not provided in the sensing apparatuses shown in FIGS. 1 and 2, the excitation light 51 can enter into the substrate 11.

In the total reflection excitation-type sensing apparatuses, when the emission 61 from the luminescent substance 31 is detected by the detector 60 arranged opposite to the metal-based particle assembly 12 and luminescent substance 31 side relative to the substrate 11 (see FIGS. 1 and 2), the metal-based particle assembly 12 preferably has a sufficiently high absorbance at the above-described plasmon peak in view of its emission enhancement effect, whereas the absorbance is preferably not excessively high so that the emission 61 can be sufficiently detected by the detector 60.

Specifically, when the metal-based particle assembly 12 as layered on a glass substrate is subjected to absorption spectrum measurement by absorptiometry, the absorbance at the maximum wavelength of the plasmon peak at the longest wavelength in the ultraviolet to visible light region is preferably 0.1 or more and 1.5 or less, more preferably 0.1 or more and 1.2 or less, still more preferably 0.1 or more and 1.0 or less, and even more preferably 0.1 or more and 0.8 or less.

The apparatus structure of the sensing apparatus is not limited to those shown in FIGS. 1 and 2, and may be that shown in FIG. 3, for example. The sensing apparatus shown in FIG. 3 is a reflection-type optical sensing apparatus. In the sensing apparatus shown in FIG. 3, both the light source 50 and detector 60 are arranged opposite to the metal-based particle assembly 12 side relative to the capturing layer 20.

In the reflection-type optical sensing apparatus shown in FIG. 3, the supporting member 40 may not necessarily be provided.

In the reflection-type sensing apparatus, the emission 61 from the luminescent substance 31 is detected by the detector 60 arranged on the same side as the metal-based particle assembly 12 and luminescent substance 31 side relative to the substrate 11 (see FIG. 3). Therefore, unlike in the total reflection excitation-type sensing apparatuses, the metal-based particle assembly 12 preferably has a higher absorbance at the above-described plasmon peak in view of its emission enhancement effect.

Specifically, when the metal-based particle assembly 12 as layered on a glass substrate is subjected to absorption spectrum measurement by absorptiometry, the absorbance at the maximum wavelength of the plasmon peak at the longest wavelength in the ultraviolet to visible light region is preferably 0.1 or more, more preferably 0.5 or more, still more preferably 0.8 or more, and even more preferably 1.3 or more.

The following describes the structural elements other than the metal-based particle assembly 12 that are or may be included in the sensing apparatus.

(2) Capturing Layer

The capturing layer 20 is a layer that is arranged on the metal-based particle assembly 12 of the layered body 10 and has the capturing substance 21 for capturing the analyte 32 labeled with the luminescent substance 31. When the above-described protective layer 13 is formed, the capturing layer 20 may be arranged on the protective layer 13.

The "capturing substance" is a substance that functions to capture a substance that specifically binds thereto (the analyte 32), and may be fixed in the capturing layer 20, or may be present in a free state in the capturing layer 20, or may be fixed to the surface of the protective layer 13. The surface of the capturing layer 20 may be subjected to a treatment for inducing binding active groups that can specifically bind to the analyte 32, and such binding active groups may be used as the capturing substance 21. An assembly of such binding active groups may also be considered as the capturing layer 20.

The capturing substance 21 may be any organic substance or inorganic substance as long as the substance have the above-described function, and specific examples include biological substances, such as nucleosides, nucleotides, nucleic acids, proteins, and sugars, and cells. Alternatively, the capturing substance 21 may be a substance with binding active groups that can bind to functional groups of the analyte 32 by electrostatic interactions.

In one embodiment, the material of the capturing layer 20 is not limited to a particular material, and may be an organic material, an inorganic material, an oxide thereof, or the like, for example, indium tin oxide (ITO), $SiO_2$, $Si_3N_4$, $TiO_2$, $Ta_2O_5$, or $Al_2O_3$.

In one embodiment, the capturing layer 20 has the capturing substance 21 that can specifically bind to the analyte 32. For example, the surface of the capturing layer 20 is subjected to a treatment for inducing binding active groups that can specifically bind to specific groups of the analyte 32. Such binding active groups function as the capturing substance 21. Examples of such binding active groups include carboxyl and hydroxyl groups that electrostatically interact with bases.

The "analyte" is a substance on which a qualitative or quantitative detection is to be performed, and is a substance that specifically binds to the capturing substance 21. The analyte 32 may be any organic substance or inorganic substance, and examples include biological substances, such as nucleosides, nucleotides, nucleic acids, proteins, and sugars, viruses, and cells.

The nucleic acids mean polymers of phosphates of nucleosides (nucleotide chains) in which purine or pyrimidine bases and sugar are glycosidically linked, and include oligonucleotides including probe DNA, polynucleotides, DNA formed by polymerization of purine nucleotides and pyrimidine nucleotides (full length or fragments thereof), RNA, and polyamide nucleotide derivatives (PNA). The nucleosides are compounds in which bases and sugar are glycosidically linked, and the nucleotides are compounds in which phosphoric acid is linked to the nucleosides; both the nucleosides and nucleotides are compounds containing bases.

The term "specifically bind" broadly means chemical bonding including non-covalent bonding, covalent bonding, and hydrogen bonding between substances, for example, interactions between protein molecules and electrostatic interactions between molecules. The capturing substance 21 and the analyte 32 that specifically binds thereto may be exemplified by capturing of sugar chains by lectins; and capturing of molecules by clathrate compounds.

The combination of the capturing layer 20 and the layered body 10 causes the specific binding between the capturing substance 21 and the analyte 32 to proceed in a reaction zone near the capturing layer 20, and functions as a sensor chip for detecting the analyte 32. A sensor chip for which the analyte 32 is a biological material, a virus, a cell, or the like is also referred to as a biochip. The analyte 32 captured by the capturing layer 20 can be detected by pre-labeling the analyte 32 with the luminescent substance 31, and detecting emission from the luminescent substance 31. The luminescent substance 31 may be a labeling substance that specifically binds to a complex obtained by the specific binding between the capturing substance 21 and the analyte 32. The luminescent substance 31 is a substance that emits light upon injection of excitation energy, such as excitation light. The principle of emission of light by the luminescent substance 31 is not limited to a particular principle, and includes fluorescence, phosphorescence, and chemiluminescence. The luminescent substance 31 may be a conventionally known luminescent substance.

The sensing apparatus according to the present invention includes the metal-based particle assembly 12 according to the present invention and thus, can enhance the emission from the luminescent substance 31, leading to improved sensitivity of the sensing apparatus.

The sensing apparatus according to the present invention includes the metal-based particle assembly according to the present invention, which has a broad range of the effect of localized plasmon resonance, and thus, can enhance the emission from the luminescent substance 31 even if the distance from the upper surface of the metal-based particle assembly 12 to the luminescent substance 31 is long, i.e., above 10 nm.

For example, DNA that may be the analyte 32 may have a size of about several nm to several ten nm, and may be 5 to 15 nm. A virus may have a size of about several ten nm to several hundred nm, and may be 30 to 120 nm. When each of these substances is the analyte 32, the distance between the luminescent substance 31 labeling the analyte 32 and the upper surface of the metal-based particle assembly 12 may be several ten nm to several hundred nm, for example. The sensing apparatus of the present invention can enhance the emission from the luminescent substance 31 even in this case.

In the sensing apparatus, the distance from the upper surface of the metal-based particle assembly 12 to the luminescent substance 31 may be 15 nm or more, further 25 nm or more, and still further more than that. The distance from the upper surface of the metal-based particle assembly 12 to the luminescent substance 31 is preferably 200 nm or less, more preferably 170 nm or less, and still more preferably 150 nm or less, in view of the sensitivity of the sensing apparatus.

The average thickness of the capturing layer 20 is preferably selected so that the distance from the upper surface of the metal-based particle assembly 12 to the luminescent substance 31 falls in the above-described range, for example, 1 nm or more and 50 nm or less.

The analyte 32 preferably has a length of 1 μm or less. When the analyte 32 has a length above 100 nm, it is preferred to make an adjustment so that the analyte 32 is captured with the luminescent substance 31 as a labeling substance being positioned in the range of the effect of plasmon resonance. When the analyte 32 is a chain compound, such as a nucleic acid, the length herein means the chain length.

Furthermore, the sensing apparatus of the present invention includes the metal-based particle assembly 12 according to the present invention that exhibits intense plasmon resonance, and thus, can perform detection with high sensitivity, even if the luminescent substance 31 used as a labeling substance has low emission efficiency, or even if the amount of the analyte 32 is small.

The maximum wavelength of the plasmon peak of the metal-based particle assembly 12 preferably coincides with or is close to the emission wavelength of the luminescent substance 31 used as a labeling substance. This can more effectively increase the emission enhancing effect of plasmon resonance. The maximum wavelength of the plasmon peak of the metal-based particle assembly 12 can be controlled by adjusting the metal species, the average particle diameter, the average height, the aspect ratio, and the average interparticle distance and/or the standard deviation of the average interparticle distance of the metal-based particles constituting the metal-based particle assembly 12.

(3) Protective Layer

The layered body 10 may have the protective layer 13 covering the surface of each metal-based particle constituting the metal-based particle assembly 12 (see FIG. 2).

The protective layer 13 is preferably insulating. When the protective layer 13 is insulating, non-conductivity of the metal-based particle assembly 12 (non-conductivity between the metal-based particles) can be ensured. If a current incidentally flows through the metal-based particle assembly 12, the emission enhancing effect of plasmon resonance may be reduced. Furthermore, the provision of the protective layer 13 covering the metal-based particles can prevent the metal-based particles from coming into direct contact with a layer other than the protective layer 13 or the external environment, thereby preventing degradation of the metal-based particles.

Materials with good insulating properties are preferably used as materials constituting the protective layer 13, for example, spin-on-glass (SOG; for example, a material containing an organosiloxane material), as well as $SiO_2$, $TiO_2$, $Al_2O_3$, and $Si_3N_4$.

While the thickness of the protective layer 13 is not limited to a particular thickness as long as it can prevent the metal-based particles from coming into direct contact with a layer other than the protective layer 13 or the external environment, the thickness is preferably smaller to the extent that desired protection is assured, because there are preferred ranges of the distance from the upper surface of the metal-based particle assembly 12 to the luminescent substance 31 as described above. The thickness of the protective layer 13 is, for example, 1 nm or more and 150 nm or less, preferably 1 nm or more and 100 nm or less, and more preferably 2 nm or more and 80 nm or less. The thickness of the protective layer 13 is defined as the value obtained by subtracting the average height of the metal-based particle assembly 12 from the average thickness from the upper surface of the substrate 11 to the upper surface of the protective layer 13.

(4) Supporting Member and Substrate of Layered Body

In the total reflection excitation-type sensing apparatuses as shown in FIGS. 1 and 2, the supporting member 40 is a member arranged opposite to the metal-based particle assembly 12 side relative to the substrate 11, and can function as a member for supporting the layered body 10 and as a member for introducing the excitation light 51 into the substrate 11. In this case, the excitation light 51 emitted from the light source 50 enters into the supporting member 40.

The supporting member 40 is preferably formed of a material and a structure (for example, a light-transmitting polymer plate, a slide glass, a light-transmitting plate such as a quartz substrate, or a prism) capable of total reflection of the excitation light 51 entering into the supporting member 40.

When the supporting member 40 functions as a member for introducing the excitation light 51 into the substrate 11, the supporting member 40 usually has light-transmitting properties, and is preferably optically transparent, in order to allow the excitation light 51 to propagate in the supporting member 40, and allow the emission 61 from the luminescent substance 31 to be detected by the detector 60 arranged opposite to the luminescent substance 31 side relative to the supporting member 40. The supporting member 40 with light-transmitting properties preferably has a light transmittance of 80% or more, more preferably a light transmittance of 90% or more, with respect to the light that is to propagate or be transmitted through the member.

Examples of materials constituting the supporting member 40 include silicon, quartz, synthetic quartz, glass, and thermoplastic resins.

In the total reflection excitation-type sensing apparatuses as shown in FIGS. 1 and 2, the supporting member 40 may not be provided. In this case, the excitation light 51 is capable of entering into the substrate 11.

In the total reflection excitation-type sensing apparatuses as shown in FIGS. 1 and 2, the substrate 11 usually has light-transmitting properties, and is preferably optically transparent, in order to allow the emission 61 from the luminescent substance 31 to be detected by the detector 60 arranged opposite to the luminescent substance 31 side relative to the supporting member 40. The substrate 11 with light-transmitting properties preferably has a light transmittance of 80% or more, more preferably a light transmittance of 90% or more, with respect to the light that is to be transmitted through the substrate.

In the reflection-type sensing apparatus as shown in FIG. 3, the supporting member 40 and the substrate 11 may or may not have light-transmitting properties. In the reflection-type sensing apparatus as well, the supporting member 40 may not be provided.

When the sensing apparatus includes the substrate 11 and the supporting member 40, they are usually bonded to each other. The substrate 11 and the supporting member 40 may be bonded with a refractive index adjusting liquid interposed therebetween. Examples of refractive index adjusting liquids include immersion oils and liquid paraffin. Commercial refractive index adjusting liquids may be used.

(5) Detector

Examples of the detector 60 for detecting the emission 61 from the luminescent substance 31 include a spectrometer, an epifluorescence microscope, a total internal reflection fluorescence microscope, and a scanning near-field optical microscope.

If the excitation light 51 may be mixed with the emission 61 during detection of the emission 61, it is preferred to allow the emission 61 to enter the detector 60 through a wavelength cut filter that cuts off light at the wavelength of the excitation light 51.

EXAMPLES

The present invention will be described in more detail with reference to examples, although the present invention is not limited thereto.

Example 1

(1) Production of Layered Body

A direct-current magnetron sputtering apparatus was used under the following conditions to grow silver particles extremely slowly on a soda glass substrate to form a thin film of a metal-based particle assembly on the entire surface of the substrate to produce a layered body having the substrate and the metal-based particle assembly.

gas used: argon;
pressure in chamber (sputtering-gas pressure): 10 Pa;
substrate-to-target distance: 100 mm;
sputtering power: 4 W;
average particle diameter growth rate (average particle diameter/metal-based particle growth time): 0.9 nm/min;
average height growth rate (=average deposition rate=average height/metal-based particle growth time): 0.25 nm/min;
substrate temperature: 300° C.;
substrate size and shape: a square measuring 5 cm per side
metal-based particle growth time: 120 min FIG. 4 shows SEM images of the film of the metal-based particle assembly in the obtained layered body, as observed from directly above. FIG. 4(a) is a magnified image at a scale of 50000 times, and FIG. 4(b) is a magnified image at a scale of 100000 times. The SEM images were obtained using the scanning electron microscope "JSM-5500" produced by JEOL Ltd. (and in the other examples as well).

From the SEM images shown in FIG. 4, the silver particles constituting the metal-based particle assembly of Example 1 were determined to have an average particle diameter of 102 nm, an average interparticle distance of 11.3 nm, and a standard deviation of the average interparticle distance of 0.35 nm, based on the above-described definitions. The SEM images show that the metal-based particle assembly of Example 1 has about $6.25 \times 10^{10}$ silver particles (about 25 particles/$\mu m^2$).

The average height was determined as 20.6 nm based on the results of AFM imaging using "VN-8010" produced by KEYENCE CORPORATION. Thus, the aspect ratio (average particle diameter/average height) of the silver particles was calculated as 4.95.

Based on the SEM image at a scale of 50000 times, the coverage as measured according to the above-described method was 79%.

Prior to the calculation of the coverage using the spreadsheet software "Excel" produced by Microsoft Corporation, the free image processing software "ImageJ" produced by U.S. National Institutes of Health was used to read in the 50000 times magnified SEM image at 8 bit and 720×480 pixels, and then the contrast and brightness of the image was adjusted as described below.

On the free image processing software "ImageJ" produced by U.S. National Institutes of Health, "Analyze-"→"Histogram"→"List" is opened. As "value" is viewed in the order of increasing value, when "count" is maximum, the value of "count" is defined as $I_{max}$. As "value" is viewed in the order of increasing value, when the "count" value exceeded $I_{max} \times 0.04$ for the first time, the "value" is defined as $V_{min}$; and as "value" is viewed in the order of increasing value, when the "count" value exceeded $I_{max}$ and then decreased below $I_{max} \times 0.04$, the "value" is defined as $V_{max}$.

Then, "Image"→"Adjust"→"Brightness/Contrast . . . " is opened. The "Minimum" bar is moved horizontally to adjust the value to $V_{min}$. The "Maximum" bar is subsequently moved horizontally to adjust the value to $V_{max}$. The "Apply" button is subsequently pressed to confirm the contrast and brightness of the image.

The surface of the metal-based particle assembly in the obtained layered body was connected to the tester [multimeter ("E2378A" produced by Hewlett Packard Co.] to check for conductivity. As a result, non-conductivity was confirmed.

(2) Production of Sensor Chip

With reference to FIG. 5, silver particles were grown under the same conditions as in (1) above to form the metal-based particle assembly 12 described in (1) above on a substrate 11, which was a 0.7 mm thick alkali-free glass substrate. Immediately thereafter, a protective layer 13 with an average thickness of 3 nm was layered by spin-coating a spin-on-glass (SOG) solution onto the metal-based particle assembly layer to produce a sensor chip A. The protective layer 13 was a layer also functioning as a simulated capturing layer.

The SOG solution was a solution obtained by diluting the organic SOG material "OCD T-7 5500T" produced by Tokyo Ohka Kogyo Co., Ltd. with ethanol.

(3) Production of Optical Sensing Apparatus and Detection of Emission from Luminescent Substance With reference to FIG. 5, rhodamine B solution was spin-coated onto the surface of the protective layer 13 of the sensor chip A obtained in (2) above at a rotation speed of 2000 rpm, and then dried to fix rhodamine B dye as the luminescent substance 31 to the surface of the protective layer 13. Rhodamine B solution was prepared by dissolving rhodamine B dye (Rhodamine 110; Exciton) in ethanol to give a concentration of 0.15 mM.

Then, an optical sensing apparatus as shown in FIG. 5 was constructed. Specifically, a prism 41 composed of light-transmitting glass "BK7" as a supporting member was prepared, and the sensor chip A with the luminescent substance 31 produced above was layered on one main surface of the prism 41 with a liquid paraffin layer 70 interposed therebetween. The sensor chip A was layered so that the substrate 11 was in contact with the liquid paraffin layer 70. The liquid paraffin layer 70 precludes an air layer being interposed between the substrate 11 and the prism 41, and was arranged by means of inserting the paraffin layer having a refractive index close to the refractive indices of these members so that the excitation light passed through the prism and the liquid paraffin layer 70 and was introduced into the substrate 11.

A fluorescence spectrophotometer (trade name: PMA-12 produced by Hamamatsu Photonics K.K.) was used as the detector 60.

In the optical sensing apparatus shown in FIG. 5, the excitation light 51 with a wavelength of 532 nm was directed to the prism 41 using the light source 50. The excitation light 51 directed to the prism 41 traveled linearly to enter the sensor chip A (layered body 10). Upon total reflection of the excitation light 51 at the interface between the sensor chip 1A and the outside, evanescent wave was generated near the surface of the sensor chip to excite the luminescent substance 31. The emission spectrum of emission 61 which was enhanced by resonating the excited luminescent substance 31 with the metal-based particle assembly 12 was measured by the detector 60 through a wavelength cut filter 80 that cuts off light at the wavelength of the excitation light 51.

For the obtained emission spectrum, the integral of the emission spectrum over the wavelength range of 540 to 800 nm was calculated.

FIG. 6 shows the obtained emission spectrum.

Example 2

(1) Production of Layered Body

A direct-current magnetron sputtering apparatus was used under the following conditions to grow silver particles extremely slowly on a soda glass substrate to form a thin film of a metal-based particle assembly on the entire surface of the substrate to produce a layered body having the substrate and the metal-based particle assembly.

gas used: argon;
pressure in chamber (sputtering-gas pressure): 10 Pa;
substrate-to-target distance: 100 mm;
sputtering power: 4 W;
average particle diameter growth rate (average particle diameter/metal-based particle growth time): 0.9 nm/min;
average height growth rate (=average deposition rate=average height/metal-based particle growth time): 0.25 nm/min;
substrate temperature: 300° C.;
substrate size and shape: a square measuring 5 cm per side
metal-based particle growth time: 240 min FIG. 7 shows SEM images of the metal-based particle assembly film in the obtained layered body, as observed from directly above. FIG. 7(*a*) is a magnified image at a scale of 50000 times, and FIG. 7(*b*) is a magnified image at a scale of 100000 times.

From the SEM images shown in FIG. 7, the silver particles constituting the metal-based particle assembly of Example 2 were determined to have an average particle diameter of 246 nm, an average interparticle distance of 21.7 nm, and a standard deviation of the average interparticle distance of 21.2 nm, based on the above-described definitions. The SEM images show that the metal-based particle assembly of Example 2 has about $6.25 \times 10^{10}$ silver particles (about 25 particles/$\mu m^2$).

The average height was determined as 57.3 nm based on the results of AFM imaging using "VN-8010" produced by KEYENCE CORPORATION. Thus, the aspect ratio (average particle diameter/average height) of the silver particles was calculated as 4.29.

The coverage as measured as in Example 1 was 78%.

The surface of the metal-based particle assembly in the obtained layered body was connected to the tester [multimeter ("E2378A" produced by Hewlett Packard Co.] to check for conductivity. As a result, non-conductivity was confirmed.

(2) Production of Sensor Chip, Production of Optical Sensing Apparatus and Detection of Emission from Luminescent Substance A sensor chip B was produced as in Example 1, except that silver particles were grown under the same conditions as in (1) of Example 2 above to form the metal-based particle assembly 12 described in (1) above on a substrate 11, which was a 0.7 mm thick alkali-free glass substrate.

Then, an optical sensing apparatus was constructed as in Example 1, except that the sensor chip B was used, and the emission spectrum or the emission 61 was measured as in Example 1. For the obtained emission spectrum, the integral of the emission spectrum over the wavelength range of 540 to 800 nm was calculated.

Comparative Example 1

(1) Production of Layered Body

A direct-current magnetron sputtering apparatus was used under the following conditions to grow silver particles extremely slowly on a soda glass substrate to form a thin film of a metal-based particle assembly on the entire surface of the substrate to produce a layered body having the substrate and the metal-based particle assembly.

gas used: argon;
pressure in chamber (sputtering-gas pressure): 10 Pa;
substrate-to-target distance: 100 mm;
sputtering power: 4 W;
average particle diameter growth rate (average particle diameter/metal-based particle growth time): 0.9 nm/min;
average height growth rate (=average deposition rate=average height/metal-based particle growth time): 0.25 nm/min;
substrate temperature: 300° C.;
substrate size and shape: a square measuring 5 cm per side
metal-based particle growth time: 360 min From the obtained SEM images, the silver particles constituting the metal-based particle assembly of Comparative Example 1 were determined to have an average particle diameter of 335 nm, an average interparticle distance of 16.7 nm, and a standard deviation of the average interparticle distance of 27.8 nm, based on the above-described definitions. The SEM images show that the metal-based particle assembly of Comparative Example 1 has about $6.25 \times 10^{10}$ silver particles (about 25 particles/$\mu m^2$).

The average height was determined as 96.2 nm based on the results of AFM imaging using "VN-8010" produced by KEYENCE CORPORATION. Thus, the aspect ratio (average particle diameter/average height) of the silver particles was calculated as 3.48.

The coverage as measured as in Example 1 was 85%.

The surface of the metal-based particle assembly in the obtained layered body was connected to the tester [multimeter ("E2378A" produced by Hewlett Packard Co.] to check for conductivity. As a result, non-conductivity was confirmed.

(2) Production of Sensor Chip, Production of Optical Sensing Apparatus and Detection of Emission from Luminescent Substance A sensor chip C was produced as in Example 1, except that silver particles were grown under the same conditions as in (1) of Comparative Example 1 above to form the metal-based particle assembly 12 described in (1) above on a substrate 11, which was a 0.7 mm thick alkali-free glass substrate.

Then, as optical sensing apparatus was constructed as in Example 1, except that the sensor chip C was used, and the emission spectrum of the emission 61 was measured as in Example 1. For the obtained emission spectrum, the integral of the emission spectrum over the wavelength range of 540 to 800 nm was calculated.

Reference Example

A sensor chip D was produced as in Example 1, except that the layered body was replaced by a soda glass substrate not having the metal-based particle assembly formed thereon. In the sensor chip D, the protective layer 13 composed of SOG was formed directly on the soda glass substrate.

Then, an optical sensing apparatus was constructed as in Example 1, except that the sensor chip D was used, and the emission spectrum of the emission 61 was measured as in Example 1. For the obtained emission spectrum, the integral of the emission spectrum over the wavelength range of 540 to 800 nm was calculated.

FIG. 6 shows the obtained emission spectrum.

Evaluation of Emission Enhancing Effect

The integrals of the emission spectra in Examples 1, 2, and Comparative Example 1, relative to the integral of the emission spectrum of Reference Example 1 taken as 1, were calculated. The results are shown below:
Example 1: 8.4
Example 2: 5.4
Comparative Example 1: 2.3

REFERENCE SIGNS LIST

10: layered body, 11: substrate, 12: metal-based particle assembly, 13: protective layer, 20: capturing layer, 21: capturing substance, 31: luminescent substance, 32: analyte, 40: supporting member, 41: prism, 50: light source, 51: excitation light, 60: detector, 61: light emitted from luminescent substance, 70: liquid paraffin layer, 80: wavelength cut filter

The invention claimed is:

1. A metal-based particle assembly comprising a plurality of metal-based particles arranged apart from each other,
   wherein the plurality of metal-based particles are each arranged so that an average distance between metal-based particles adjacent to each other is 1 nm or more and 1000 nm or less, and
   a standard deviation of the average distance is 25 nm or less.

2. The metal-based particle assembly according to claim 1, wherein the plurality of metal-based particles have an average particle diameter of 5 nm or more and 800 nm or less.

3. A layered body comprising:
   a substrate having a first main surface and a second main surface opposed to the first main surface; and
   the metal-based particle assembly according to claim 1 layered on the first main surface,
   wherein the plurality of metal-based particles are arranged two-dimensionally apart from each other in the metal-based particle assembly.

4. The layered body according to claim 3, wherein a proportion of an area covered with the metal-based particle assembly to an area of the first main surface is 65% or more.

5. A sensing apparatus for detecting an analyte, comprising:
   the layered body according to claim 3;
   a capturing layer that is arranged on the metal-based particle assembly and has a capturing substance for capturing the analyte, the analyte being labeled with a luminescent substance;
   a light source that emits excitation light for exciting the luminescent substance; and
   a detector that detects emission from the luminescent substance.

6. The sensing apparatus according to claim 5, further comprising a supporting member arranged opposite to the metal-based particle assembly side relative to the substrate.

7. The sensing apparatus according to claim 5, wherein the substrate has light-transmitting properties, and
   the detector is arranged opposite to the metal-based particle assembly side relative to the substrate.

8. The sensing apparatus according to claim 6, wherein the capturing layer, the metal-based particle assembly, the substrate, and the supporting member are arranged in this order,
   the substrate and the supporting member have light-transmitting properties, and
   the detector is arranged opposite to the substrate side relative to the supporting member.

9. The sensing apparatus according to claim 8, wherein the excitation light enters into the supporting member.

* * * * *